April 18, 1950     J. P. VOLLRATH     2,504,764
THERMOCOUPLE WITH WIRE INSULATION
Filed Aug. 30, 1946

*INVENTOR.*
JOSEPH P. VOLLRATH
BY
ATTORNEY.

Patented Apr. 18, 1950

2,504,764

UNITED STATES PATENT OFFICE 2,504,764

THERMOCOUPLE WITH WIRE INSULATION

Joseph P. Vollrath, North Wales, Pa., assignor, by mesne assignments, to Minneapolis-Honeywell Regulator Company, Minneapolis, Minn., a corporation of Delaware Application August 30, 1946, Serial No. 694,141

3 Claims. (Cl. 136—4)

The present invention relates to thermocouples, and more particularly to thermocouples that are designed to measure the temperature of molten aluminum and other molten metals.

The measurement of molten metal temperature has always been a difficult problem, and the measurement of the temperature of molten aluminum is particularly difficult because of the fact that this metal in its molten state is extremely corrosive. In the past it has sometimes been the custom to keep a thermocouple, protected by a suitable tube, in the metal pot. This has numerous disadvantages. One objection to this procedure is that the corrosive effect of the metal renders tube life short and uncertain. The tube may fail at any time with the result that inaccurate readings, or no readings, of the temperature will be obtained. Another objection to protecting tubes for this service is the thermal lag that they impart to temperature measurement. The pouring temperature of aluminum is critical, making such a lag extremely objectionable.

Another expedient used in measuring molten metal temperatures is the use of portable thermocouples whose wires are uninsulated as well as unconnected. With the thermocouples of this type the wires are short circuited at the surface of the metal. Therefore, only surface temperature can be obtained, and the surface temperature is always lower than the true temperature of the metal. Also when the wires of a thermocouple of this type become dirty parasitic currents are set up so that erroneous readings are obtained.

It is an object of this invention to provide a thermocouple for measuring the sub-surface temperature of molten metal that will overcome the above mentioned defects. It is a further object of the invention to provide a thermocouple that is easy and inexpensive to manufacture.

It is a further object of the invention to provide a portable thermocouple that is capable of withstanding the effects of molten aluminum for a large number of immersions. The thermocouple is so manufactured that it is not adversely affected by the effects of thermal shock due to repeated immersions in molten metal. It is a further object of the invention to provide a thermocouple that will stand up and continue to give accurate results over a long period of time in spite of the rough handling that it will receive by foundry personnel.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described preferred embodiments of the invention.

Figure 2:
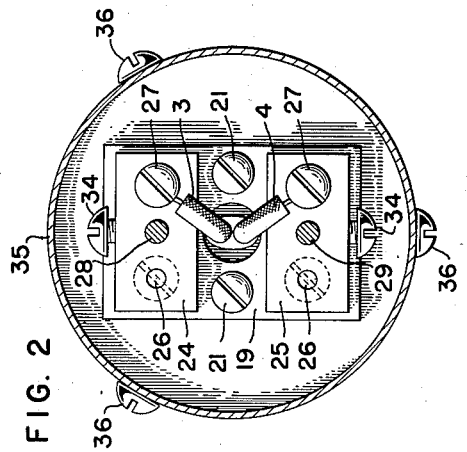
Figure 2 is a view taken on line 2—2 of Figure 1.

Referring to the drawing, it will be seen that the entire thermocouple assembly is supported by a metal tube 1 of suitable length. Tube 1 may conveniently be of steel. Located in this tube is a cable 2 for the thermocouple lead wires 3 and 4. The left end of the tube has attached to it a ceramic member 5 that serves as a terminal block between the thermocouple lead wires and the extension wires 9 and 11 which extend between the thermocouple assembly and a measuring or recording instrument with which the thermocouple is used. This ceramic member is provided with two openings that extend lengthwise through it, each of which receives a metal sleeve 6 or 7. The ends of the thermocouple lead wires and of the extension wires are placed in these sleeves as is best shown in the drawings. The various wires are held in their respective sleeves by suitable screws indicated at 8 so that the extension wires 9 and 11 are connected electrically with lead wires 3 and 4 respectively by the metal sleeves 6 and 7. The extension wires are protected by a cover 12 to form a cable which may be of any necessary length to extend to the recording instrument. It is noted that there is provided a spring 13, one end of which is held adjacent the ceramic member 5 and the other end of which surrounds cable 12. This spring serves the purpose of preventing the cable from kinking or bending too sharply where it leaves the thermocouple assembly.

A handle 14 is provided to cover the left end of tube 1, member 5 and the parts attached thereto. This handle is held in engagement with a flange 15 that is welded to the tube, by means of a screw 16 that extends through the flange and into the handle. In assembling the device the handle is first slipped over the extension wire and the various wires are connected. The handle is then moved to the right to cover and protect the parts and is fastened to the flange.

Figure 1:
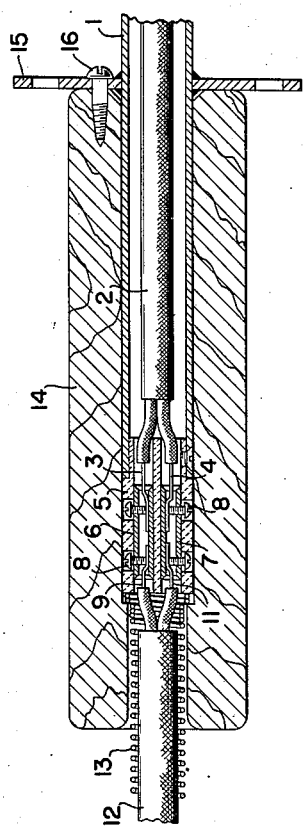
Figure 1 shows a section through the entire length of the thermocouple.
Figure 3:
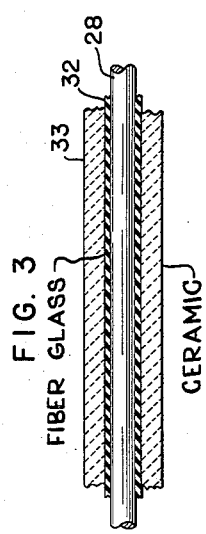
Figure 3 is a section taken through one of the thermocouple wires.

A thermocouple terminal block assembly and the thermocouple wires themselves are attached to the right end of tube 1. To this end a sleeve 17 of material, such as steel, which is more rigid than the tube itself is welded to the right end of the tube. Received on the end of this sleeve and attached thereto by screws is a collar portion that projects to the left from a flange 18. This flange has attached to it the various parts of the terminal. By reference to Figures 1 and 2 it will be seen that there is provided a ceramic block 19 which is fastened to the outer face of flange 18 by screws 21. A fibre washer 22 is used between block 19 and flange 18 in order to protect the block. Metallic terminal blocks 24 and 25 are attached to the right face of ceramic block 19 by means of screws 26 and 27 as best shown in Figure 2 of the drawing. Screws 26 are preferably passed through block 19 first and then through the metal blocks 24 or 25. This means that there is one less screw head and therefore one less obstruction on the outer face of the metal blocks. Screws 27 are, of necessity, placed in the blocks with their heads exposed since these screws also serve to connect lead wires 3 and 4 to blocks 24 and 25 respectively.

The thermocouple itself is composed of wires 28 and 29 of Chromel and Alumel which are joined at their right ends by a very responsive welded junction 31 of small mass. These wires are received respectively by openings formed in blocks 24 and 25 and are held in these openings by screws 34 that are threaded through the blocks and into engagement with the wires.

A cover 35 is placed over the whole terminal assembly and held in place on flange 18 by screws 36. If desired, openings may be made in the cover through which screws 34 may be reached, so that it is not necessary to remove the cover each time the thermocouple is changed.

In the manufacture of the thermocouple itself, wires 28 and 29 are first welded as shown at 31. The wires are then bent to the form illustrated in the drawing and covered with woven or braided fibre glass sleeves 32. These sleeves are slid over the free ends of the wires and both protect the wires and serve the purpose of making a covering for the wires rough enough so that a ceramic coating will stick to them. Thereafter the thermocouple is held by its hot junction and dipped into a ceramic known as Firefrax and consisting of aluminum silicate, kaolin clay and sodium silicate as a binder. The dipping operation is repeated enough times to build up a coating 33 of the ceramic of sufficient thickness. Normally this coating should be approximately 1/8" thick. After the coating is thick enough the thermocouple is placed in a furnace and baked until all traces of moisture are removed from it. Thereafter the ceramic and fibreglass tube are removed from the free ends of the wires for approximately one-half inch and the wires are placed in the openings that have been provided in blocks 24 and 25. The wires can be fastened in the blocks by the screws 34 by means of a screw driver that is inserted through the suitable openings in cover 35. If preferred however, the cover 35 can be moved down on the wires while screws 34 are being tightened and then moved back into position on flange 18.

Apparently because of its woven or braided construction, the fibre glass sleeves 32 engage the thermocouple wires tight enough to remain in place, but yet loose enough to permit the wires to expand upon being heated without cracking the ceramic covering. This reduces the possibility of failure of the thermocouple due to thermal shock, and appreciably lengthens its life.

The entire thermocouple assembly is about three and one-half or four feet long while the thermocouple wires themselves are approximately a foot long. This is long enough so that an operator may hold the tip of the thermocouple in a pot of molten metal without getting burnt. In some cases it is desirable to have the thermocouple wires extend at an angle to the handle. In such a case an additional inch or so of the covering is removed from the unconnected ends of the thermocouple wires. The ends of the wires are then placed in a suitable clamp and pressure is applied firmly to both wires close to the clamp until the desired angle bend is obtained. In placing the wires in the holder care must be exercized to prevent the wires from grounding on cover 36.

In a temperature measuring operation in which a thermocouple of the type disclosed herein is used, the operator will grasp the thermocouple by the handle 14 and will immerse the hot junction 31 below the surface of the metal for several inches. It has been found that it will take approximately seven seconds for the thermocouple to heat up to the metal temperature so that an accurate temperature reading may be obtained with a total of ten seconds immersion. The thermocouple then is quickly withdrawn and shaken to remove metal particles therefrom. A thermocouple constructed in a manner described herein will give an accurate temperature reading for a large number of immersions. It is not affected by any dirt or contamination that will appear on the surface of the wires since the E. M. F. is generated at a welded joint. Furthermore the ceramic coating 33 will prevent the metal from short-circuiting the wires at its surface, therefore, the tip of the wire can be immersed to any desired depth in order to obtain an accurate reading of the sub-surface temperature of the metal.

From the above description it will be seen that I have provided a thermocouple which is easily manufactured from readily obtainable parts, and one in which the temperature of molten metal may be accurately obtained in an extremely short time. This is of advantage since the shorter time that the thermocouple has to be immersed in the metal the longer it will last.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. A thermocouple for measuring the sub-surface temperature of molten metal including a pair of dissimilar wires joined at one end by a welded junction, a sleeve of braided insulating material surrounding said wires with a fit such that said wires may expand due to changes in heat without appreciably expanding said sleeve due to the loose character of the braid of said sleeve, and a coating of heat resistant and insulating ceramic material surrounding said wires and sleeves from a point adjacent said welded junction to a point beyond the depth to which said thermocouple is to be immersed in the molten metal.

2. A thermocouple for use with molten metal including a pair of thermocouple wires each of a different metal and joined to the other at one end, a sleeve of woven or braided insulating material surrounding each of said wires, and a layer of a ceramic consisting of aluminum silicate, kaolin clay and sodium silicate as a binder on each sleeve.

3. A thermocouple for use with molten aluminum or like corrosive metal including at least one pair of wires each of a different metal and joined at one end into an integral joint, a sleeve of loosely woven or braided fibre glass surrounding each of said wires, and a layer of an insulating and heat resistant ceramic on each of said sleeves, said ceramic comprising the residue remaining after aluminum silicate, kaolin clay and sodium silicate as a binder has been baked until all traces of moisture are removed.

JOSEPH P. VOLLRATH.

REFERENCES CITED

The following references are of record in the file of this patent:

FOREIGN PATENTS

| Number | Country | Date |
|--------|---------|------|
| 288,105 | Great Britain | Apr. 5, 1928 |

OTHER REFERENCES

Underwood et al.: Automotive Industries, June 15, 1940, page 573.

Hess et al.: Welding Journal, November 1943, page 560s.

Larson, W. S., Product Engineering, Sept. 1944, pages 605-6.

Taylor, G. F.: Ind. & Eng. Chem., vol 12, 1920, page 797.

Trimble, H. M.: Ind. & Eng. Chem. (Anal. Ed.), vol. 12, 1940, page 52.